(12) United States Patent
Kang

(10) Patent No.: US 10,491,013 B2
(45) Date of Patent: *Nov. 26, 2019

(54) BATTERY SYSTEM HAVING BATTERY MANAGER

(71) Applicant: SAMSUNG SDI CO., LTD., Yongin-si, Gyeonggi-do (KR)

(72) Inventor: Dongyoun Kang, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 240 days.

This patent is subject to a terminal disclaimer.

(21) Appl. No.: 15/616,530

(22) Filed: Jun. 7, 2017

(65) Prior Publication Data

US 2017/0358936 A1    Dec. 14, 2017

(30) Foreign Application Priority Data

Jun. 13, 2016   (KR) .................. 10-2016-0073204

(51) Int. Cl.
| | | |
|---|---|---|
| *H01M 10/46* | (2006.01) | |
| *H02J 7/00* | (2006.01) | |
| *H01M 2/20* | (2006.01) | |
| *H01M 2/34* | (2006.01) | |
| *H01M 10/48* | (2006.01) | |

(Continued)

(52) U.S. Cl.
CPC .......... *H02J 7/0026* (2013.01); *H01M 2/206* (2013.01); *H01M 2/34* (2013.01); *H01M 10/482* (2013.01); *H02J 7/0045* (2013.01); *H01M 2/1077* (2013.01); *H01M 10/486* (2013.01); *H01M 2010/4271* (2013.01); *H01M 2220/10* (2013.01); *H02J 7/0014* (2013.01); *H02J 2007/0096* (2013.01)

(58) Field of Classification Search
USPC .................. 320/116, 117, 118, 132, 134, 136
See application file for complete search history.

(56) References Cited

U.S. PATENT DOCUMENTS

| | | |
|---|---|---|
| 7,990,101 B2 | 8/2011 | Hoff et al. |
| 9,300,016 B2 | 3/2016 | Yun |

(Continued)

FOREIGN PATENT DOCUMENTS

| | | |
|---|---|---|
| JP | 2013-062951 A | 4/2013 |
| KR | 10-2009-0008473 A | 1/2009 |

(Continued)

OTHER PUBLICATIONS

U.S. Appl. No. 15/657,639, filed Jul. 24, 2017.

*Primary Examiner* — Edward Tso
(74) *Attorney, Agent, or Firm* — Lee & Morse, P.C.

(57) ABSTRACT

A battery system includes battery modules connected in parallel Each battery modules includes a battery, a first and second output terminals, a switch arrangement connected between the battery and the first output terminal, and a battery manager. The battery manager is to detect a current of the battery, determine whether an overcurrent condition exists based on the detected current, and control the switch arrangement. The battery manager to transmit module state information to the battery managers in remaining ones of the battery modules, and the battery managers in the battery modules control their switch arrangements based on the module state information.

16 Claims, 4 Drawing Sheets

(51) Int. Cl.
*H01M 2/10* (2006.01)
*H01M 10/42* (2006.01)

(56) References Cited

U.S. PATENT DOCUMENTS

| | | | |
|---|---|---|---|
| 2007/0108946 A1* | 5/2007 | Yamauchi | H01M 10/42 |
| | | | 320/132 |
| 2014/0015477 A1 | 1/2014 | Tsai | |
| 2014/0028098 A1 | 1/2014 | Trigiani | |
| 2014/0084867 A1* | 3/2014 | Hamaoka | H02J 7/0016 |
| | | | 320/116 |
| 2017/0054134 A1* | 2/2017 | Choi | H02J 7/0013 |

FOREIGN PATENT DOCUMENTS

| | | |
|---|---|---|
| KR | 10-2010-0098550 A | 9/2010 |
| KR | 10-2014-0035799 A | 3/2014 |

* cited by examiner

BATTERY SYSTEM HAVING BATTERY MANAGER

CROSS-REFERENCE TO RELATED APPLICATION

Korean Patent Application No. 10-2016-0073204, filed on Jun. 13, 2016, and entitled, "Battery System," is incorporated by reference herein in its entirety.

BACKGROUND

1. Field

One or more embodiments described herein relate to a battery system.

2. Description of the Related Art

Some electronic equipment is turned on continuously or for long periods of time, e.g., communication equipment. For stability reasons, battery systems are often used to provide direct current power to this equipment. These battery systems are also used to provide back-up power when a failure occurs in a main power source.

Efforts are continually being made to increase battery capacity. One approach involves connecting multiple battery modules in parallel. When one or more battery modules become detached from bus bars, current may be concentrated in other ones of the battery modules. As a result, an overcurrent condition may arise for a battery module having a relatively low degree of internal resistance. This may cause large current to flow in the last battery module, causing damage to the entire battery system.

SUMMARY

In accordance with one or more embodiments, a battery system includes a plurality of battery modules connected in parallel, each of the battery modules including: a battery; a first output terminal and a second output terminal; a switch arrangement connected between the battery and the first output terminal; and a battery manager to detect a current of the battery, determine whether an overcurrent condition exists based on the detected current, and control the switch arrangement, wherein the battery manager in each of the battery modules is to transmit module state information to the battery managers in remaining ones of the battery modules, the module state information indicating whether the overcurrent condition exists in a corresponding one of the battery modules, and wherein the battery manager in each of the battery modules is to control the switch arrangement based on the module state information.

In accordance with one or more other embodiments, a battery system includes a first battery module; a second battery module; a bus connecting the first and second battery modules; and a plurality of bus bars connecting the first and second battery modules, wherein the first battery module includes a first battery manager and the second battery module includes a second battery module, the first and second battery managers to exchange module state information along the bus, and wherein the first and second battery managers are to electrically disconnect the first and second battery modules from the bus bars when the module state information exchanged on the bus indicates that one of the first or second battery modules has an error condition.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
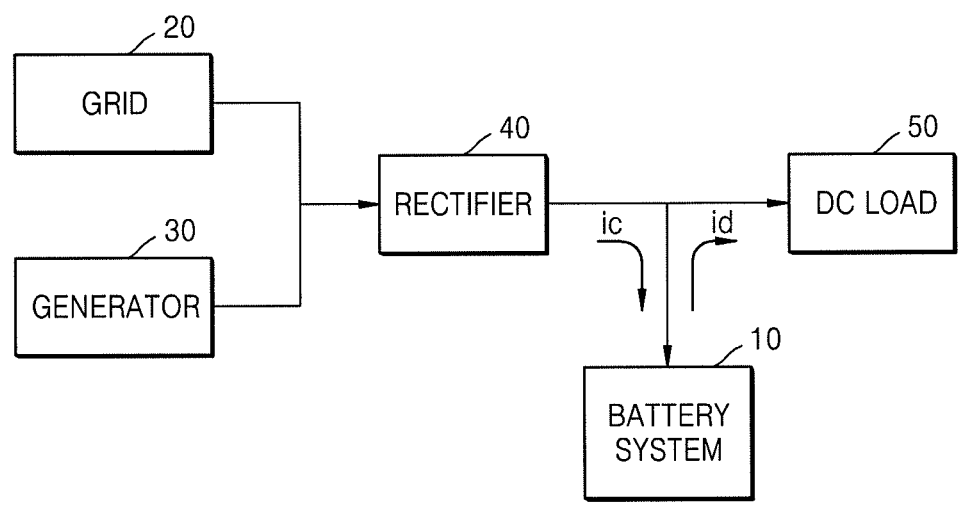
FIG. 1 illustrates an example of a usage scenario including a battery system.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a usage scenario which includes a battery system. Referring to FIG. 1, a grid 20 includes a power plant, a substation, and a power line and may be referred to as an electric grid or a commercial electric grid supplying commercial power. When the grid 20 is in one (e.g., a normal) state, a rectifier 40 may receive alternating current (AC) power from the grid 20. When the grid 20 is in an (e.g., abnormal) state (e.g., when a power failure occurs), a generator 30 may supply AC power to the rectifier 40.

The generator 30 produces AC power from an energy source. For example, the generator 30 may be an engine generator producing electrical energy using fossil fuels. For example, the generator 30 may be a diesel generator. The generator 30 may generate electricity and supply the electricity to the rectifier 40.

The rectifier 40 converts AC power from the grid 20 or the generator 30 to DC power for supply to a DC load 50. The DC power output from the rectifier 40 may be provided to the DC load 50 or used to charge a battery system 10. For example, the rectifier 40 may be a power supply that uses a device such as a switching transistor to convert AC power to DC power by a switch control method. In this case, the rectifier 40 may be a switched mode power supply (SMPS) for outputting stable DC power by controlling the ratio of on and off times of a semiconductor switching device. In another example, the rectifier 40 may perform a converter function to convert DC electricity stored in the battery system 10 to AC electricity for output to the grid 20. In this case, the rectifier 40 may be referred to as a bidirectional converter.

The battery system 10 is connected between the rectifier 40 and the DC load 50. The battery system 10 may be charged using DC current output from the rectifier 40. In this case, DC current output from the rectifier 40 to the battery system 10 may be referred to as charge current ic. Some of the DC current output from the rectifier 40 may be supplied to the DC load 50. Other or a remaining portion of the DC current may be supplied to the battery system 10 as charge current ic. When DC current is not output from the rectifier 40 due to a power failure or another type of defect or malfunction, or the amount of DC current output from the rectifier 40 is less than the amount of current consumed by the DC load 50, the battery system 10 may supply DC electricity to the DC load 50. In this case, current from the battery system 10 to the DC load 50 may be referred to as discharge current id.

The DC load 50 is a load which consumes DC electricity supplied from the rectifier 40 or the battery system 10. The DC load 50 may be an electric load that operates without interruption. Even when the rectifier 40 is out of order, the DC load 50 may operate without interruption based on DC current from the battery system 10. For example, the DC load 50 may include communication equipment, e.g., high-speed information and communication equipment, intelligent home network equipment, telephones, interphones, guidance, and display devices, broadcasting devices, or alarm devices. For example, the DC load 50 may be wireless communication equipment installed in a base station for connecting terminals to a network. In this case, when DC electricity is not supplied to the DC load 50 and operation of the DC load 50 stops, wireless communication may become impossible within the coverage area of the base station. Therefore, DC power is stably supplied to the DC load 50 without interruption.

Figure 2:
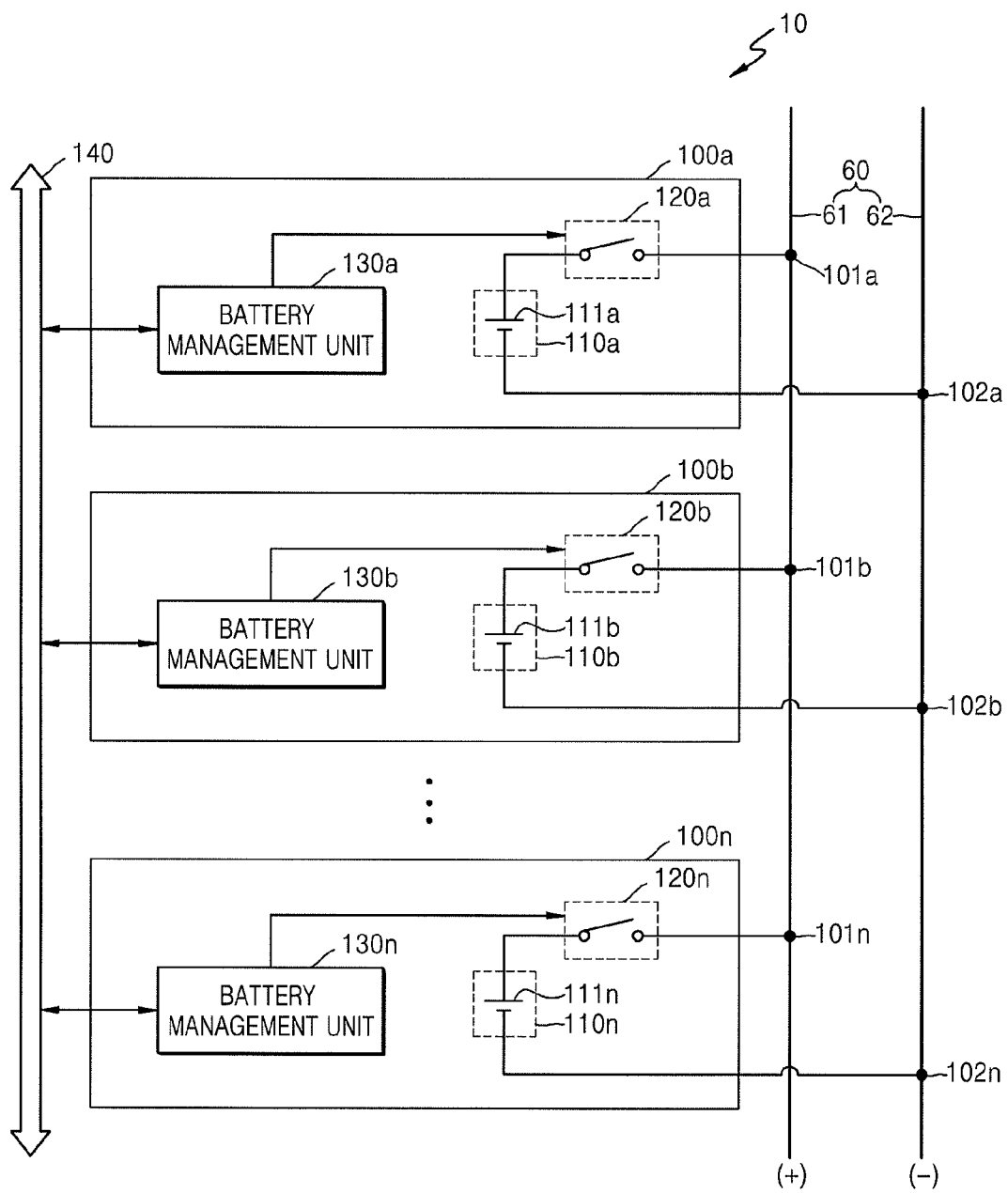
FIG. 2 illustrates an embodiment of the battery system.

FIG. 2 illustrates an embodiment of the battery system 10 which includes a plurality of battery modules 100a to 100n connected in parallel using a pair of bus bars 61 and 62. The pair of bus bars 61 and 62 may be collectively referred to as bus bars 60, and the plurality of battery modules 100a to 100n may be collectively referred to as battery modules 100. The battery system 10 may include a communication bus 140 which provides a communication path between or among the battery modules 100.

The battery modules 100a to 100n respectively include batteries 110a to 110n, first and second output terminals 101a to 101n and 102a to 102n respectively connected to the pair of bus bars 61 and 62, switch units 120a to 120n connected between the batteries 110a to 110n and the first output terminals 101a to 101n, and battery management units 130a to 130n to detect current of the batteries 110a to 110n, determine the occurrence of an overcurrent (or other malfunction) based on the detected current, and control the switch units 130a to 130n.

The battery module 100a includes the battery 110a, the first and second output terminals 101a and 102a, the switch unit 120a, and the battery management unit 130a. The battery module 100b includes the battery 110b, the first and second output terminals 101b and 102b, the switch unit 120b, and the battery management unit 130b.

The battery module 100n includes the battery 110n, the first and second output terminals 101n and 102n, the switch unit 120n, and the battery management unit 130n. The batteries 110a to 110n, the first and second output terminals 101a to 101n and 102a to 102n, the switch units 120a to 120n, and the battery management units 130a to 130n may be collectively referred to as batteries 110, first and second output terminals 101 and 102, switch units 120, and battery management units 130, respectively, when characteristics thereof are described without specifying a particular battery module (for example, the battery module 100a).

The battery management units 130a to 130n are connected to and communicate with each other through the communication bus 140. Each of the battery management units 130 (e.g., the battery management unit 130a of the battery module 100a) transmit module state information of the corresponding battery module 100a to the other battery management units 130b to 130n, receive module state information from the other battery management units 130b to 130n, and control the corresponding switch unit 120a based on the module state information. Like the battery management unit 130a, the battery management unit 130b of the battery module 100b transmits module state information of the corresponding battery module 100b to the other battery management units 130a and 130c to 130n, receive module state information from the other battery management units 130a and 103c to 130n, and control the corresponding switch unit 120b based on the module state information.

In accordance with at least one embodiment, the expression "corresponding" may indicate a battery module in which the feature(s) being described are included or elements of the battery module. For example, a battery module corresponding to the battery management unit 130a may be the battery module 100a in which the battery management unit 130a is included, and a battery corresponding to the battery management unit 130a is the battery 110a of the battery module 100a in which the battery management unit 130a is included.

The expression "other" is used to indicate elements other than the feature(s) being described or to indicate elements other than elements corresponding to the features(s). For example, when the battery management unit 130a is described, the other battery management units refer to the battery management units 130b to 130n other than the battery management unit 130a. In addition, when the battery management unit 130a is described, the other batteries refer to the batteries 110b to 110n other than the battery 110a corresponding to the battery management unit 130a.

The bus bars 60 are connected between the rectifier 40 (e.g., refer to FIG. 1) and the DC load 50 (e.g., refer to FIG. 1). DC power output from the rectifier 40 is supplied to the DC load 50 through the bus bars 60. In FIG. 2, the first bus bar 61 is positive and the second bus bar 62 is negative. In one embodiment, the second bus bar 62 may be grounded. The bus bars 60 may be replaced with other power-transmitting elements, e.g., power cables or a bus duct.

The battery modules 100a to 100n are connected in parallel through the bus bars 60. The battery modules 100a to 100n may be independently charged with DC power from the rectifier 40 and may independently supply DC power to the DC load 50. Even when one of the battery modules 100a to 100n, for example, the battery module 100a, is separated from the bus bars 60 due to breakdown or for replacement, operation of the other battery modules 100b to 100n are not affected. As a result, the reduction in the total capacity of the battery system 10 may be limited or minimized.

All the battery modules 100a to 100n may be connected to the communication bus 140 to communicate with each other. In addition to the battery modules 100a to 100n, a communication device may be connected to the communication bus 140. The communication device may collect module state information transmitted from the battery modules 100a to 100n. However, the communication device may not control the battery modules 100a to 100n.

The battery modules 100a to 100n may independently operate, for example, based on one or more internal algorithms. For example, the battery module 100a receives module state information from the other battery modules 100b to 100n, but the battery modules 100b to 100n do not control the battery module 100a. The battery modules 100a to 100n may have the same connection structure and algorithm(s), even though the battery modules 100a to 100n have different identification numbers. In one embodiment, the battery modules 100a to 100n may be substantially identical.

The battery modules 100 include the batteries 110, the switch units 120, and the battery management units 130. The battery modules 100 include the first and second output terminals 101 and 102 respectively connected to the bus bars 61 and 62 (first and second bus bars 61 and 62). In FIG. 2, the first bus bar 61 may be positive. Thus, the first output terminals 101 (e.g., 101a, 101b, ... 101n) are connected to positive electrodes of the batteries 110. The second output terminals 102 (e.g., 101a, 101b, ... 101n) are connected to negative electrodes of the batteries 110. In one embodiment, the first and second output terminals 101 and 102 may be paths formed by electric wires or power cables through which charge current flows to batteries 110 and discharge current flows outward from batteries 110. The electric wires or power cables may be fixed to the bus bars 60 using, for example, bolts and nuts.

Each of the batteries 110 stores electricity and includes at least one battery cell 111. (In accordance with one or more embodiments, the terms "electricity" and "power" may be used interchangeable). In FIG. 2, each of the batteries 110 includes one battery cell 111. However, each of the batteries 110 may include a plurality of the battery cells 111. The plurality of battery cells 111 may be connected in series, parallel, or series-parallel. The number of battery cells 111 in each of the batteries 110 may be determined, for example, based on a predetermined output voltage level of the rectifier 40 or a predetermined voltage level of the DC load 50.

The battery cell 111 may include a rechargeable secondary battery cell. Examples of the battery cell 111 may include nickel-cadmium battery cells, lead battery cells, nickel metal hydride (NMH) battery cells, lithium-ion battery cells, and lithium polymer battery cells.

Referring to FIG. 2, the batteries 110a to 110n are electrically connected in parallel to the bus bars 60 respectively through the corresponding switch units 120a to 120n. For example, the batteries 110a to 110n are selectively connected to the bus bars 60 by corresponding switch units 120a to 120n. In accordance with one or more embodiments, the expression "selectively connected" may indicate that a feature may be connected or disconnected according to an external control signal provided from, for example, one of the battery management units 130.

Also, as illustrated in FIG. 2, the batteries 110 are electrically connected in parallel to the bus bars 60 when the switch units 120 are closed. The batteries 110 are electrically separated when the switch units 120 are opened. For example, the battery 110a corresponding to the switch unit 120a is electrically connected to the bus bars 60 when the switch unit 120a is closed. The battery 110a is electrically separated from the bus bars 60 when the switch unit 120a is opened.

The switch units 120 may be between the batteries 110 and the first output terminals 101. In another example embodiment, the switch units 120 may be between the batteries 110 and the second output terminals 102. For example, the switch units 120 may include relay switches or field effect transistors (FETs). The switch units 120 may include body diodes and metal oxide semiconductor field effect transistors (MOSFETs) that are turned on or off by control signals from the battery management units 130.

The battery management units 130 may be connected to the batteries 110 and the switch units 120 corresponding to the battery management units 130. The battery management units 130 control overall operations of the battery modules 100 according to one more internal algorithms. The battery management units 130 may perform, for example, overcharge protection, over-discharge protection, overcurrent protection, overvoltage protection, overheat protection, cell balancing, or other functions that may or may not be related to a malfunction.

The battery management units 130 detect currents of corresponding batteries 110. The battery management units 130 may detect charge and discharge currents of corresponding batteries 110. The battery modules 100 may include, for example, current sensors provided along high-current paths between the batteries 110 and the first and second output terminals 101 and 102. The current sensors may be Hall sensors and/or other types of sensors. The battery management units 130 may determine the occurrence of an overcurrent condition by comparing currents of the batteries 110 with a present current value. For example, when the current of one of the batteries 110 is greater than the present current value (or another predetermined value) for a present time period, the battery management unit 130 corresponding thereto may determine that an overcurrent condition exists.

The battery management units 130 may detect battery voltages of corresponding batteries 110. The battery voltages may be cell voltages of the battery cells 111 of the batteries 110. When each of the batteries 110 includes a plurality of battery cells 111, the battery voltages may include cell voltages of corresponding battery cells 111. The battery management units 130 may be electrically connected to nodes between the battery cells 111. For example, a battery voltage may include a module voltage between the positive and negative electrodes of each of the batteries 110. In addition, a battery voltage may include a terminal voltage between the first and second output terminals 101 and 102. The battery management units 130 may be connected to the positive and negative electrodes of the batteries 110 through wires.

Each of the battery management units 130 may include a battery voltage detector for directly detecting a module voltage and/or a terminal voltage of a corresponding battery 110. The battery voltage detector may include a voltage divider connected between the positive and negative electrodes of the battery 110 and/or between the first and second output terminals 101 and 102; and an analog-digital convertor (ADC) to convert an output signal of the voltage divider to a digital signal.

The battery management units 130 may periodically detect currents and battery voltages of corresponding batteries 110. The battery management units 130 may detect, for example, currents and battery voltages of corresponding batteries 110 at preset intervals (e.g., every 500 ms).

The battery management units 130 may detect temperatures of the batteries 110, in addition to detecting currents and battery voltages of the batteries 110. For example, the battery management units 130 may measure temperatures of the batteries 110 using temperature sensors. The battery management units 130 may calculate one or more values (e.g., state of charge (SOC), state of health (SOH), and/or remaining lifespan) based on detected battery voltages, charge and discharge currents, and temperatures.

The battery management units 130 may determine the states of the battery modules 100 based on detected battery voltages, charge and discharge currents, and/or temperatures. For example, when a detected charge current is greater than a preset charge current value, the battery management units 130 may determine this state to be an overcharge current state. When a detected discharge current is greater than a preset discharge current value, the battery management units 130 may determine this state to be an overdischarge current state. When a detected battery voltage is greater than a normal voltage range, the battery management units 130 may determine this state to be an overcharge state. When the detected battery voltage is less than the normal voltage range, the battery management units 130 may determine this state to be an overdischarge state.

When a detected temperature is greater than a preset normal temperature range, the battery management units 130 may determine this state to be a high-temperature state. When the detected temperature is lower than the normal temperature range, the battery management units 130 may determine this state to be a low-temperature state. In addition, the battery management units 130 may detect connection states of the switch units 120. When each of the switch units 120 includes a plurality of switches, battery management units 130 may detect whether each of the switches is opened or closed.

The battery management units 130 may manage the batteries 110 based on detection and calculation results. The battery management units 130 may control the switch units 120 in order to manage the batteries 110. The battery management units 130 may output control signals, according to one or more internal algorithms, in order to control the switch units 120. For example, when the battery management units 130 determine that the batteries 110 are in a high-temperature state, the battery management units 130 may control the switch units 120 to limit the magnitudes of charge and discharge currents of the batteries 110. When the battery management units 130 determine that an overcharge or overdischarge condition exists, the battery management units 130 may perform an operation according to a preset internal algorithm in order to protect the batteries 110.

The battery management units 130a to 130n may be connected to the communication bus 140 for communication with each other. A controller area network (CAN) communication protocol may be used, for example, for communication between the battery management units 130a to 130n. In one embodiment, another type of communication protocol may be used to transmit data on a communication bus or other type of communication link. In addition to the battery management units 130a to 130n, an external device may be connected to the communication bus 140. The external device may collect module state information transmitted through the communication bus 140. The external device may receive module state information transmitted between the battery management units 130a to 130n through a communication board connected to the communication bus 140.

The battery management units 130a to 130n connected to the communication bus 140 may be synchronized. For example, the time of one of the battery management units 130a to 130n (for example, the battery management unit 130a) may be selected as a reference, and the times of the other battery management units 130b to 130n may be synchronized with the time of battery management unit 130a. The battery management units 130a to 130n may detect currents and battery voltages of corresponding batteries 110 according to preset timing. In this case, the currents and battery voltages may be detected at the same time. A battery management unit having the lowest identification number may be determined as a reference battery management unit for synchronization.

The battery management units 130 may transmit module state information of corresponding battery modules 100 to the communication bus 140. The battery management units 130 may transmit module state information of corresponding battery modules 100 to the communication bus 140 in a preset order. The preset order may be determined, for example, based on identification information (e.g., numbers) of the battery management units 130. The battery management units 130 may have unique identification numbers that do not overlap each other. For example, a battery management unit 130 having a low identification number may first transmit module state information. Each of the battery management units 130 may check how many identification numbers of other battery management units 130 are lower than its own identification number. The battery management unit 130 may transmit its module state information when its corresponding time period elapses and after battery management units 130 having lower identification numbers transmit module state information.

Figure 3:
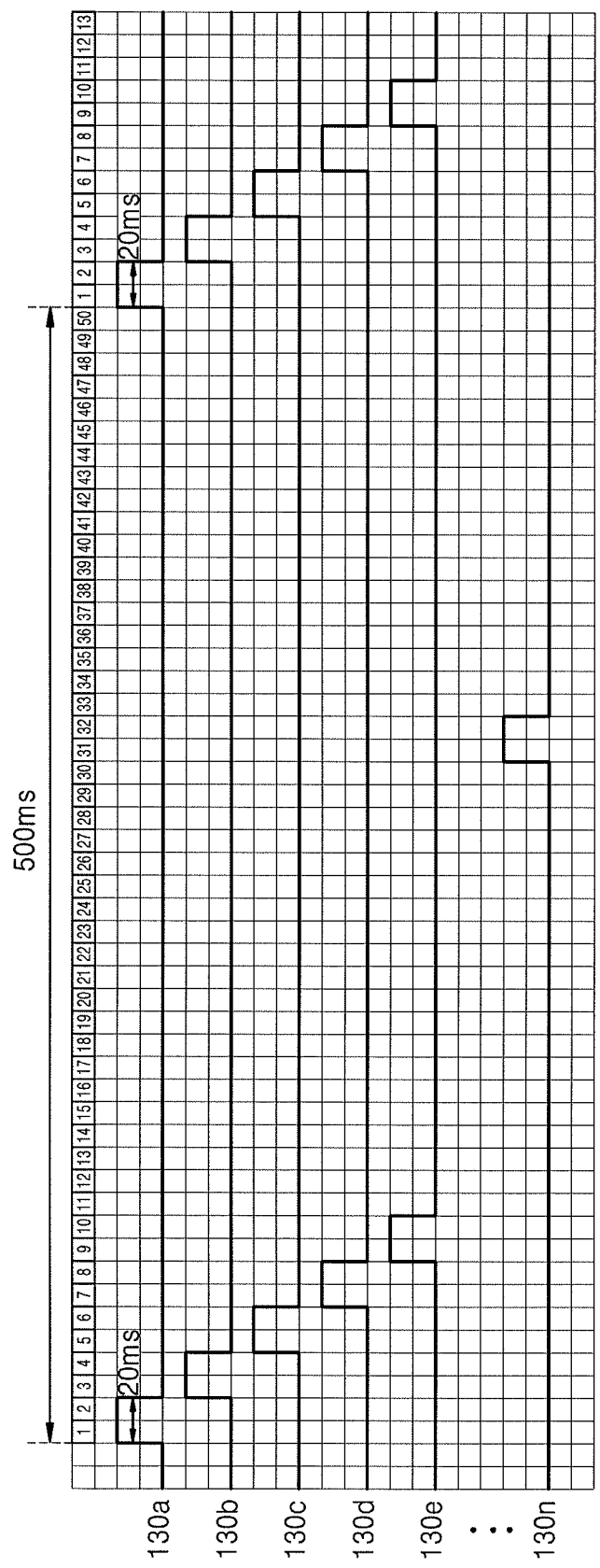
FIG. 3 illustrates an embodiment for transmitting battery module state information.

FIG. 3 illustrates an embodiment of timings at which the battery management units 130 transmit module state information. In this embodiment, the battery system 10 includes sixteen battery modules 100. Also, battery management unit 130a has the lowest identification number, battery management unit 130b has the second lowest identification number, and battery management unit 130n has the highest identification number. The battery system 10 may have a different number (more or less than 16) of battery modules in another embodiment.

Referring to FIG. 3, each number (e.g., 1 to 50) in the uppermost row corresponds to a time period of 10 ms. First, the battery management unit 130a of the battery module 100a transmits module state information of the battery module 100a to the communication bus 140. The battery management unit 130b transmits module state information of the battery module 100b (e.g., 20 ms) after the battery management unit 130a starts to transmit module state information about the battery module 100a. The battery management unit 130a may complete transmission of module state information before the battery management unit 130b starts to transmit module state information, e.g., battery management unit 130a may complete transmission of module state information within 20 ms. In this manner, the sixteenth battery management unit 130n transmits module state information of the sixteenth battery module 100n, for example, 300 ms (20 ms×15), after the battery management unit 130a starts to transmit module state information.

The battery management units 130 may sequentially transmit module state information to the communication bus 140, for example, by a broadcast method. Therefore, each of the battery management units 130 may receive module state information of the other battery modules 100 transmitted from the other battery management units 130. For example, the second to sixteenth battery management units 130b to 130n may receive module state information transmitted by the battery management unit 130a. The first and third to sixteenth battery management units 130a and 130c to 130n may receive module state information transmitted by the second battery management unit 130b. In this manner, the first to fifteenth battery management units 130a to 130(n−1) may receive module state information transmitted by the sixteenth battery management unit 130n.

The battery management units 130 may transmit module state information in each preset time period (e.g., 500 ms). In addition, the battery management units 130 may detect one or more values (e.g., battery voltages, charge and discharge currents, temperatures) of corresponding batteries 110 and may control corresponding switch units 120 at preset timing after the last battery management unit 130n transmits module state information (for example, about 400 ms after the battery management unit 130a starts to transmit module state information). Therefore, even when parameters of the battery system 10 vary over time, since the battery management units 130 detect the parameters at the same time, detected data may be highly reliable. In addition, since the switch units 120 are simultaneously controlled, some of the switch units 120 may not be opened or closed late. Thus, errors caused by concentration of charge or discharge current in one of the battery modules 100 may be prevented.

When the period during which the battery management units 130 transmit module state information is 500 ms as in the above example, the number of battery modules 100 in the battery system 10 may be set to sixteen by taking detection and control times into consideration. The maximum number of battery modules 100 in the battery system 10 may be different based on, for example, the module state information transmission period and the amount of module state information.

Referring to FIG. 2, module state information about the battery modules 100 that the battery management units 130 transmit may include overcurrent state information indicating the occurrence of an overcurrent condition in the battery modules 100. The module state information may include, for example, overcharge current state information indicating that a charge current flowing into the batteries 110 of the battery modules 100 is greater than a preset charge current value, and over-discharge current state information indicating that a discharge current flowing out from the batteries 110 of the battery modules 100 is greater than a preset discharge current value. In addition, the module state information may include, for example, overcharge state information indicating that the voltage of the battery 110 of a battery module 100 is greater than a preset normal range and over-discharge state information indicating that the voltage of the battery 110 of battery module 100 is lower than the preset normal range.

In addition, the module state information may include, for example, information of charge and discharge currents, battery voltages, temperatures of the batteries 110, and connection states of the switch units 120. Each of the battery voltages may include at least one of the cell voltage of a battery cell 111, a module voltage, or a terminal voltage. The connection states of the switch units 120 may include on-off states of switches in the switch units 120.

Each of the battery management units 130 receives module state information transmitted from the other battery management units 130. After a module state information transmission period, each of the battery management units 130 has module state information of a corresponding battery module 100 and module state information of the other battery modules 100. Each of the battery management units 130 controls a corresponding switch unit 120 based on collected module state information.

For example, each of the battery management units 130 may determine whether an overcurrent condition exists in any one of the battery modules 100 based on the collected module state information. When an overcurrent condition exists in any one of the battery modules 100, the battery management units 130 may open the switch units 120 at preset timing. For example, when an overcurrent condition exists in the battery module 100a, the battery management units 130b to 130n of the battery modules 100b to 100n, as well as the battery management unit 130a of the battery module 100a, may open the corresponding switch units 120a to 120n. The switch units 120a to 120n may be controlled at preset timing, for example, at the same time. Because the switch units 120a to 120n are opened, all the batteries 110 of the battery system 10 may be simultaneously electrically separated from the bus bars 60. Therefore, it may be possible to prevent concentration of current in one or more of the batteries 110 connected to bus bars 60.

When an overcurrent condition exists in the battery module 100a, and when only the battery management unit 130a corresponding to the battery module 100a opens the switch unit 120a and current input to or output to from the battery module 100a may flow to the other battery modules 100b to 100n. Thus, an overcurrent condition may occur in one or more of the battery modules 100b to 100n, for example, the battery module 100b. In this case, when the battery management unit 130b of the battery module 100b opens the switch unit 120b, the current input to or output from the battery module 100a may flow to the other battery modules 100c to 100n. As a result, an overcurrent condition may sequentially occur in the battery modules 100a to 100n. Thus, eventually, only one battery module (for example, the battery module 100n) may be in connection with the bus bars 60, and current input to or output from the battery modules 100a to 100n may concentrate in the battery module 100n. In this case, the battery module 100n may be damaged due to a high current concentrated therein.

However, according to one or more embodiments, when an overcurrent condition exists in even one of the other battery modules 100, all the batteries 110 are separated from the bus bars 60. Thus, a concentration of high current in any one of the battery modules 100 may be prevented and the battery system 10 may be safely protected, even when an overcurrent condition or other malfunction occurs.

In addition, when one of the other battery modules 100 (for example, the battery module 100a) experiences a malfunction or error condition (e.g., is overcharged or over-discharged), the battery management unit 130a of the battery module 100a may perform a protection operation. However, the battery management units 130b to 130n of the other battery modules 100b to 100n may not perform any action in response to the malfunction or error condition of the battery module 100a.

Figure 4:
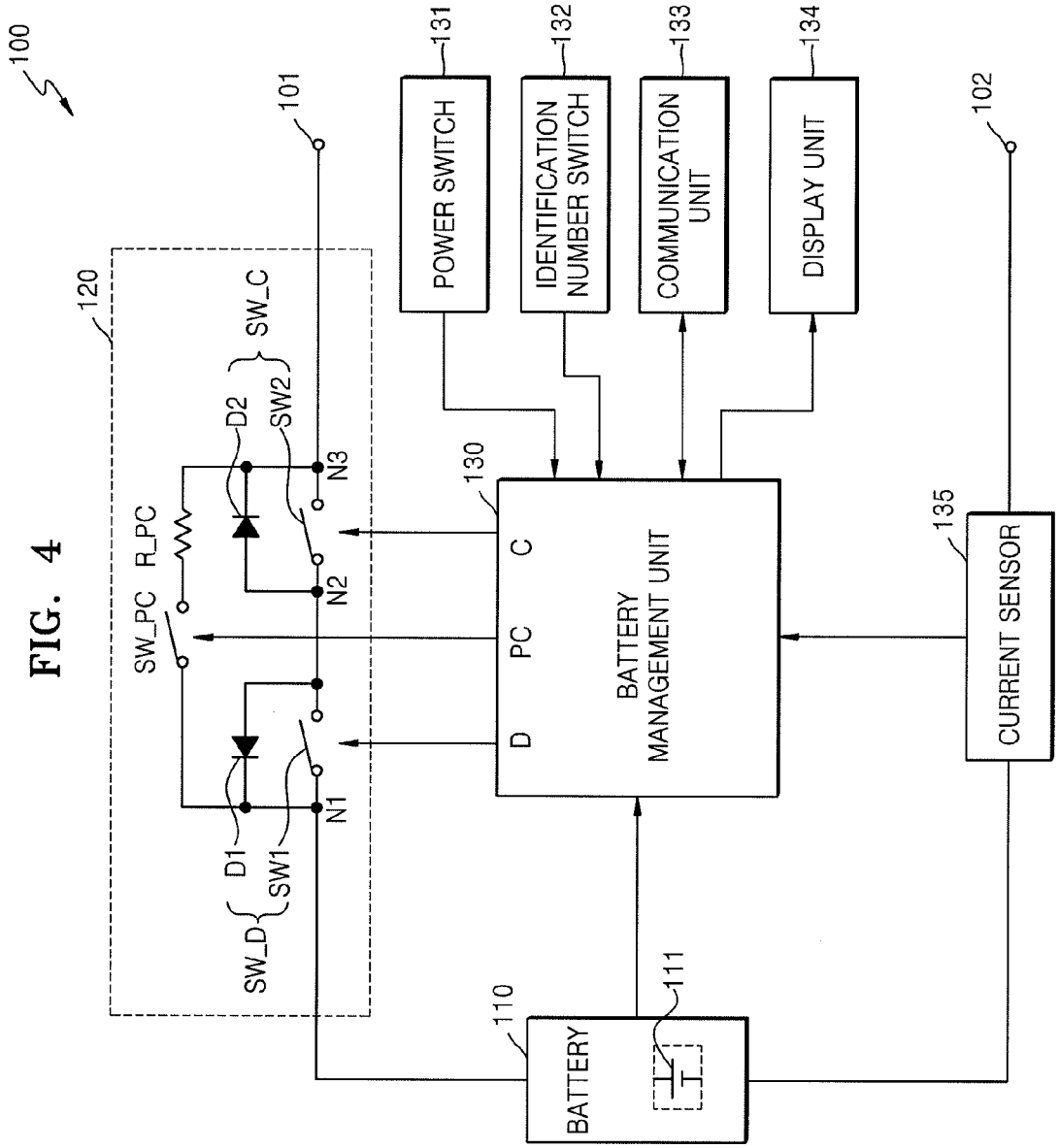
FIG. 4 illustrates an embodiment of a battery module.

FIG. 4 illustrates an embodiment of a battery module 100 of the battery system 10. Referring to FIG. 4, the battery module 100 includes a battery 110, a switch unit 120, and a battery management unit 130. The battery module 100 includes a first output terminal 101 and a second output terminal 102. The battery 110 includes at least one battery cell 111. The battery module 100 may be representative of each of the battery modules 100a to 100n in FIG. 2.

The battery management unit 130 detects charge and discharge currents of the battery 110 using a current sensor 135. The battery management unit 130 may detect the battery voltage of the battery 110. The battery management unit 130 may detect the temperature of the battery 110 using a temperature sensor.

The battery module 100 may include a power switch 131, an identification number switch 132, a communication unit 133, and a display unit 134. The battery module 100 may be turned on and off using the power switch 131. The battery system 10 includes a plurality of battery modules 100. Even when a power switch 131 of one of the battery modules 100 is manipulated, all the battery modules 100 may be turned on or off.

The identification number switch 132 assigns identification information (e.g., an identification number) to the battery module 100. An operator may manipulate the identification number switch 132 to set an identification number of the battery module 100. The battery system 10 includes a plurality of battery modules 100, and the battery modules 100 have different identification numbers.

The communication unit 133 is connected between the battery management unit 130 and the communication bus 140. The battery management unit 130 may be connected to the communication bus 140 through communication unit 133 to allow the battery management unit 130 to communicate with other battery management units 130.

The display unit 134 may display the SOC and module state of the battery module 100. For example, the display unit 134 may include a plurality of light-emitting devices. The display unit 134 may include, for example, four or another number of light-emitting diodes (LEDs).

In this case, the display unit 134 may turn on all four LEDs to indicate that the SOC of the battery module 100 is, for example, about 75% or greater. The display unit 134 may turn on less than all (e.g., only three) LEDs to indicate that the SOC of the battery module 100 ranges, for example, from about 50% to less than about 75%. The display unit 134 may turn on another number less than all (e.g., only two) LEDs to indicate that the SOC of the battery module 100 ranges, for example, from about 25% to less than about 50%. The display unit 134 may turn on only one LED to indicate that the SOC of the battery module 100 is less than, for example, about 25%.

In addition, the display unit 134 may indicate the module state of the battery module 100 by periodically turning the four LEDs on and off. The display unit 134 may indicate sixteen module states using the four LEDs. For example, the display unit 134 may indicate one or more module states, e.g., overvoltage state, a low-voltage state, a high-temperature state, a low-temperature state, an overcharge current state, an over-discharge current state, a communication error state, a cell voltage detection error state, a current sensor, switch error state, a high-temperature error state, a high-voltage error state, a low-voltage error state, and/or a cell voltage imbalance error state. Module states displayed by the display unit 134 may be transmitted to other battery management units 130 as module state information.

The switch unit 120 may include a charge control switch SW_C and a discharge control switch SW_D that are connected in series between a first node N1 and a third node N3. Charge and discharge currents of the battery 110 flow through a path including the charge control switch SW_C and the discharge control switch SW_D. The path may be referred to as a high-current path. The first node N1 is connected to a positive electrode of the battery 110. The third node N3 is connected to the first output terminal 101.

The discharge control switch SW_D includes a first switch SW1 and a first diode D1 that are connected in parallel between the first node N1 and a second node N2. The first diode D1 has a forward direction in which charge current flows from the second node N2 to the first node N1. Therefore, when the first switch SW1 is opened, charge current may flow but discharge current does not flow. When the first switch SW1 is closed, charge and discharge currents may flow. The first switch SW1 is controlled by a discharge control signal output from a discharge control terminal D of the battery management unit 130.

The charge control switch SW_C includes a second switch SW2 and a second diode D2 that are connected in parallel between the second node N2 and the third node N3. The second diode D2 has a forward direction in which discharge current flows from the second node N2 to the third node N3. Therefore, when the second switch SW2 is opened, discharge current may flow but charge current may not flow. When the second switch SW2 is closed, charge and discharge currents may flow. The second switch SW2 is controlled by a charge control signal output from a charge control terminal C of the battery management unit 130.

In addition, the switch unit 120 may include a precharge control switch SW_PC and a precharge resistor R_PC that are connected in series between the first node N1 and the third node N3. A path including the precharge control switch SW_PC and the precharge resistor R_PC may be referred to as a precharge path. Since the precharge resistor R_PC is on the precharge path, charge and discharge currents of the battery 110 are limited to a value that does not damage the battery 110. The precharge control switch SW_PC is controlled by a precharge control signal output from a precharge control terminal PC of the battery management unit 130.

The battery management unit 130 transmits module state information to the communication bus 140 through the communication unit 133, and receives module state information from the other battery management units 130 through the communication unit 133. The module state information may include, for example, overcurrent state information indicating that an overcurrent condition exists in the battery module 100. Each of the battery management units 130 may determine, based on collected module state information, whether an overcurrent condition exists in any one of the battery modules 100. When an overcurrent condition exists in any one of the battery modules 100, each of the battery management units 130 may open the charge control switch SW_C and the discharge control switch SW_D at preset timing.

For example, when an overcurrent condition exists in the battery module 100a, the battery management units 130b to 130n of the battery modules 100b to 100n, as well as the battery management unit 130a of the battery module 100a, may simultaneously open the discharge control switches SW_D and the discharge control switches SW_D of the corresponding switch units 120a to 120n. As the charge control switches SW_C and the discharge control switches SW_D of the switch units 120a to 120n are simultaneously opened, all batteries 110 of battery system 10 may be simultaneously electrically separated from the bus bars 60. Therefore, it may be possible to prevent a concentration of current in some of the batteries 110 connected to the bus bars 60.

In another example, the module state information may include overcharge current state information indicating that a charge current flowing into the battery 110 of the battery module 100 is greater than a preset charge current value and over-discharge current state information indicating that a discharge current flowing outward from the battery 110 of the battery module 100 is greater than a preset discharge current value.

Each of the battery management units 130 may determine, based on collected module state information, whether an overcharge current is flowing in any one of the battery modules 100. When an overcharge current is flowing in any one of the battery modules 100, each of the battery management units 130 may open the charge control switch SW_C of the switch unit 120.

For example, when an overcharge current is flowing in the battery module 100a, the battery management units 130b to 130n of the battery modules 100b to 100n, as well as the battery management unit 130a of the battery module 100a, may simultaneously open the charge control switches SW_C of the corresponding switch units 120a to 120n. Because all the charge control switches SW_C of the switch units 120a to 120n are opened, all the batteries 110 of the battery system 10 may not be charged by the rectifier 40. Therefore, charge current output from the rectifier 40 may not concentrate in some of the batteries 110.

Each of the battery management units 130 may determine, based on collected module state information, whether an overdischarge current flows in any one of the battery modules 100. When an overdischarge current flows in any one of the battery modules 100, each of the battery management units 130 may open the discharge control switch SW_D of switch unit 120 at preset timing. For example, when an overdischarge current flows in the battery module 100a, the battery management units 130b to 130n of the battery modules 100b to 100n, as well as the battery management unit 130a of the battery module 100a, may simultaneously open the discharge control switches SW_D of the corresponding switch units 120a to 120n. Because all the discharge control switches SW_D of the switch units 120a to 120n are opened, all the batteries 110 of the battery system 10 may not discharge current to the DC load 50. Therefore, the case where one or more of the batteries 110 outputs a concentrated level of discharge current to the DC load 50 may be prevented.

In another example, the module state information may include overcharge state information indicating that the voltage of the battery 110 of the battery module 100 is greater than a preset normal range and over-discharge state information indicating that the voltage of battery 110 of battery module 100 is lower than the preset normal range.

When one of the other battery modules 100 (for example, the battery module 100a) is overcharged, the battery management unit 130a of the battery module 100a may open the charge control switch SW_C of the switch unit 120a in response to the overcharge state. Then, the battery 110a of the battery module 100a is not charged. However, since the batteries 110b to 110n of the other battery modules 100b to 100n are not overcharged, the battery management units 130b to 130n do not perform any action in response to the overcharge state of the battery module 100a.

When one of the other battery modules 100 (for example, the battery module 100a) is over-discharged, the battery management unit 130a of the battery module 100a may open the discharge control switch SW_D of the switch unit 120a in response to the over-discharge state. Then, battery 110a of the battery module 100a is not discharged. However, since the batteries 110b to 110n of the other battery modules 100b to 100n are not over-discharged, the battery management units 130b to 130n do not perform any action in response to the over-discharge state of the battery module 100a.

As described above, according to the one or more of the above embodiments, the battery system includes battery modules connected in parallel. The battery modules share module state information with each other and operate independently of each other according to an internal algorithm based on the shared module state information. For example, when an overcurrent condition exists in any one of the battery modules, the possibility of overcurrent occurring in the other battery modules is high. Therefore, it may take a long time for the other battery modules to independently detect overcurrent and take action in response to the overcurrent.

However, according to the one or more of the above embodiments, when an overcurrent condition occurs in any one of the battery modules, the battery modules share information of the overcurrent and simultaneously separate batteries from bus bars based on the overcurrent, thereby ensuring safety from the overcurrent.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The management units, managers, switch arrangements, interfaces, signal processing and signal generating features of the disclosed embodiments may be implemented in logic which, for example, may include hardware, software, or both. When implemented at least partially in hardware, the management units, managers, switch arrangements, interfaces, signal processing and signal generating features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the management units, managers, switch arrangements, interfaces, signal processing and signal generating features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A battery system, comprising:
a plurality of battery modules connected in parallel, each of the battery modules including:
a battery;
a first output terminal and a second output terminal;
a switch arrangement connected between the battery and the first output terminal; and
a battery manager to detect a current of the battery, determine whether an overcurrent condition exists based on the detected current, and control the switch arrangement, wherein the battery manager in each of the battery modules is to transmit module state information to the battery managers in remaining ones of the battery modules, the module state information indicating whether or not the overcurrent condition exists in a corresponding one of the battery modules, and wherein the battery manager in each of the battery modules is to control the switch arrangement based on the module state information.

2. The battery system as claimed in claim 1, wherein:
the battery managers in the battery modules are to control the switch arrangement in the battery modules based on the module state information and separate corresponding batteries from the first output terminal when the module state information indicates the overcurrent condition exists.

3. The battery system as claimed in claim 2, wherein:
the battery modules have identification numbers,
operation of the battery managers in the battery modules is synchronized, and
the battery managers of the remaining ones of the battery modules are to receive the module state information indicating that the overcurrent condition exists and are to simultaneously control the switch arrangements therein at a preset timing.

4. The battery system as claimed in claim 3, wherein the battery managers in the battery modules are to transmit the module state information to each other at a preset timing based on the identification numbers.

5. The battery system as claimed in claim 1, wherein the switch arrangement includes a charge control switch and a discharge control switch connected in series between the battery and the first output terminal.

6. The battery system as claimed in claim 5, wherein:
the battery manager in the battery module having an overcharge current condition is to transmit overcharge current state information to the remaining ones of the battery modules, and
the battery managers in the remaining ones of the battery modules are to receive the overcharge current state information and to open the corresponding charge control switch based on the overcharge current state information.

7. The battery system as claimed in claim 5, wherein:
the battery manager in the battery module having an over-discharge current condition is to transmit over-discharge current state information to remaining ones of the battery modules, and
the battery managers in the remaining ones of the battery modules are to receive the overcharge current state information and to open the corresponding discharge control switch based on the over-discharge current state information.

8. The battery system as claimed in claim 1, wherein:
the battery manager in each of the battery modules is to detect a voltage of the battery and determine whether an overcharge condition or an over-discharge condition exists based on the detected voltage, and
the module state information includes overcharge state information and over-discharge state information of a corresponding one of the battery modules.

9. The battery system as claimed in claim 8, wherein:
the battery manager of the battery module having an overcharge or over-discharge condition is to control the corresponding switch arrangement based on occurrence of the overcharge or over-discharge condition and is to transmit overcharge or over-discharge state information to the battery managers in remaining ones of the battery modules, and
the battery managers in the remaining ones of the battery modules that do not have an overcharge or over-discharge condition are to receive the overcharge or over-discharge state information and are not to perform any operation in response to the overcharge or over-discharge state information.

10. The battery system as claimed in claim 1, wherein the battery manager in each of the battery modules is to transmit the module state information to the battery managers in the remaining ones of the battery modules by a broadcast method using a communication bus.

11. The battery system as claimed in claim 1, wherein the battery manager in each of the battery modules is to transmit the module state information directly to the battery manager in the remaining ones of the battery managers through a communication bus.

12. A battery system, comprising:
a first battery module;
a second battery module;
a bus connecting the first and second battery modules; and
a plurality of bus bars connecting the first and second battery modules,
wherein the first battery module includes a first battery manager and the second battery module includes a second battery module, the first and second battery managers to exchange module state information along the bus, and wherein the first and second battery managers are to electrically disconnect the first and second battery modules from the bus bars when the module state information exchanged on the bus indicates that one of the first or second battery modules has an error condition.

13. The battery system as claimed in claim 12, wherein the error condition is one of an overcharge condition, over-discharge condition, overcurrent condition, overvoltage condition, overheat condition, or a cell balancing condition.

14. The battery system as claimed in claim 12, wherein:
the first and second battery modules have identification information, and
the first and second battery managers are to control the first and second battery modules in a timing based on the identification information.

15. The battery system as claimed in claim 14, wherein the first and second battery managers are to exchange the module state information on the bus at a preset timing based on the identification information.

16. The battery system as claimed in claim 12, wherein:
the first battery module includes a first switch,
the second battery module includes a second switch, and the first and second battery managers are to control the first and second switches, respectively, based on the module state information exchanged on the bus.

* * * * *